(12) United States Patent
Tavener

(10) Patent No.: US 10,605,821 B2
(45) Date of Patent: Mar. 31, 2020

(54) SPEED SENSOR OF A VEHICLE TRANSMISSION

(71) Applicant: JAGUAR LAND ROVER LIMITED, Warwickshire (GB)

(72) Inventor: Stuart Tavener, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 304 days.

(21) Appl. No.: 15/301,052

(22) PCT Filed: Apr. 1, 2015

(86) PCT No.: PCT/EP2015/057239
§ 371 (c)(1),
(2) Date: Sep. 30, 2016

(87) PCT Pub. No.: WO2015/150483
PCT Pub. Date: Oct. 8, 2015

(65) Prior Publication Data
US 2017/0023603 A1   Jan. 26, 2017

(30) Foreign Application Priority Data

Apr. 4, 2014   (GB) .................................. 1406058.6

(51) Int. Cl.
| | | |
|---|---|---|
| *G01P 1/00* | (2006.01) |
| *G01P 3/488* | (2006.01) |
| *G01P 1/02* | (2006.01) |
| *G01P 3/487* | (2006.01) |
| *F16H 57/04* | (2010.01) |
| *B60K 17/344* | (2006.01) |
| *F16H 7/06* | (2006.01) |

(52) U.S. Cl.
CPC ............ *G01P 3/488* (2013.01); *B60K 17/344* (2013.01); *F16H 7/06* (2013.01); *F16H 57/0408* (2013.01); *G01P 1/026* (2013.01); *G01P 3/487* (2013.01)

(58) Field of Classification Search
CPC ....................................................... G01P 3/488
See application file for complete search history.

(56) References Cited

U.S. PATENT DOCUMENTS

| | | |
|---|---|---|
| 5,195,831 A | 3/1993 | Faye et al. |
| 5,550,467 A | 8/1996 | Goossens |

(Continued)

FOREIGN PATENT DOCUMENTS

| | | |
|---|---|---|
| DE | 4433973 A1 | 3/1996 |
| DE | 10 2007 011897 A1 | 9/2008 |

(Continued)

OTHER PUBLICATIONS

International Search Report and Written Opinion of the International Searching Authority for International application No. PCT/EP2015/057239 dated Sep. 2, 2015.

(Continued)

*Primary Examiner* — Jamel E Williams
(74) *Attorney, Agent, or Firm* — Carlson, Gaskey & Olds

(57) ABSTRACT

A speed sensor of a rotatable output element of a transmission comprises a rotating tone wheel (33) and an inductive pick-up (29) comprising one of a drain plug, a fill plug or a level plug. The arrangement is suitable for providing a vehicle speed signal to a vehicle tachograph.

16 Claims, 2 Drawing Sheets

(56) References Cited

U.S. PATENT DOCUMENTS

| | | | | |
|---|---|---|---|---|
| 6,425,293 | B1* | 7/2002 | Woodroffe | G01F 23/0076 |
| | | | | 73/708 |
| 6,694,285 | B1* | 2/2004 | Choe | G01H 1/003 |
| | | | | 702/182 |
| 7,285,949 | B2* | 10/2007 | Burns | F16H 59/42 |
| | | | | 324/173 |
| 2004/0119465 | A1* | 6/2004 | Clark | B60T 8/171 |
| | | | | 324/174 |
| 2005/0117825 | A1 | 6/2005 | Goto et al. | |
| 2007/0265756 | A1 | 11/2007 | Joyce et al. | |
| 2008/0066543 | A1* | 3/2008 | Sabini | G01F 23/02 |
| | | | | 73/304 C |

FOREIGN PATENT DOCUMENTS

| | | |
|---|---|---|
| EP | 1433621 A2 | 6/2004 |
| EP | 2275709 A1 | 1/2011 |
| GB | 1523920 GB | 11/1975 |
| JP | 2009058261 A | 3/2009 |
| JP | 2013081837 A | 5/2013 |
| KR | 2012024171 A | 3/2012 |
| WO | 2005/012918 A2 | 2/2005 |
| WO | 2012/145009 A1 | 10/2012 |
| WO | 2013/192262 A1 | 12/2013 |

OTHER PUBLICATIONS

Combined Search and Examination Report under Sections 17 and 18(3) for Application No. GB1406058.6 dated Sep. 24, 2014.

* cited by examiner

SPEED SENSOR OF A VEHICLE TRANSMISSION

TECHNICAL FIELD

This invention relates to a speed sensor of a vehicle transmission, in particular a sensor for indicating the rotational speed of a transmission element, and from which vehicle road speed can be derived.

BACKGROUND TO THE INVENTION

The rotational speed of a transmission output element, such as a shaft or gear wheel, provides a useful indication of vehicle speed. Historically, rotational speed has been indicated mechanically on a revolution counter connected to a transmission output element by a rotating cable within a flexible tubular casing.

More recently speed indication has been provided by electrical signal from a suitable sensor, such as an inductive sensor; this arrangement avoids the need to provide a route path for a mechanical drive, and moreover the electronic speed signal may be useful in other vehicle systems such as anti-lock braking systems, traction control systems and the like. Speed sensing may be provided electronically from a vehicle wheel.

A typical electronic speed sensor relies upon rotational movement of a toothed wheel past a relatively stationary sensor. Several kinds of such sensor are known, and typically rely upon a non-contact inductive effect; the sensor may for example be a Hall-effect sensor. Although a speed sensor may respond to the passage of the teeth of a rotating gear wheel, more usually a toothed target wheel or tone wheel is provided on the rotating element whose speed is to be sensed.

When applied to a vehicle transmission, an electronic speed sensor is typically provided as an externally threaded component for placement in a threaded through hole of the transmission casing. The through hole must be in a location which can be reached for replacement and repair, and which is also convenient for a tone wheel. The compact nature of modern vehicles, and the variety of models in which a transmission may be used, makes the selection of a suitable location somewhat problematic.

SUMMARY OF THE INVENTION

According to a first aspect of the present invention there is provided speed sensing apparatus for a vehicle transmission, said apparatus comprising a tone wheel of a rotating output element of the transmission, said tone wheel having a plurality of equispaced substantially radial arms, and an inductive pick-up comprising one of a drain plug, a fill plug or a level plug of a transmission casing.

Such an arrangement avoids the necessity of providing an additional threaded hole in the transmission casing since an existing threaded hole is used; manufacturing cost associated with an additional speed sensor is thereby eliminated. An additional feature of the invention is that, owing to requirement for access to the threaded plug, it can be assured that access for the pick-up will be available without further, extra or special measures. Accordingly the invention avoids the necessity of providing an additional access space for a threaded pick-up, which location must be suitable for all variants in which the transmission is used.

Providing a speed sensor in the vehicle transmission generally reduces the distance to the associated electronic microprocessor where speed signals are processed, as compared with for example a wheel hub speed sensor; furthermore the transmission sensor is not subject to vehicle suspension movement, and may thus be more reliable.

In some circumstances the plug may be a combined fill plug and a level plug.

The invention is particularly useful in providing an independent vehicle speed signal for use in a vehicle tachograph or the like. The sensor may be locked or latched against disconnection, to ensure that operation of the tachograph is not interrupted.

In one embodiment the tone wheel is a metal stamping having apertures to define the arms thereof, and an inner rim extending axially to provide a circular rim for interference fit with a shoulder of a transmission output member, such as a sprocket of a transfer gearbox.

The pick-up is in one embodiment provided on a screw-threaded fill or level plug, the rotational axis of the plug being substantially parallel to the axis of rotation of the output member.

According to a second aspect of the invention there is provided a vehicle transmission component, in particular a gearbox or transfer box, incorporating speed sensing apparatus according to the first aspect.

According to a third aspect of the invention there is provided a motor vehicle incorporating the vehicle transmission of the second aspect.

According to a fourth aspect of the invention there is provided electronic speed indicating apparatus of a vehicle, comprising a speed sensing apparatus of the first aspect and an electronic control unit incorporating a microprocessor, said microprocessor being adapted to convert digital signals from said inductive pick-up into an output signal indicative of vehicle speed.

According to a fifth aspect of the invention there is provided a method of sensing rotational speed of a transmission output element of a vehicle, said element being rotatable in a casing, the method comprising providing a tone wheel on said element for rotation therewith, and providing an indicative pick-up for co-operation with said tone wheel, said inductive pick-up being one of a drain plug, a fill plug or a level plug of said casing.

In a method of the invention the digital signal from the inductive pick-up is converted into an electronic signal indicative of vehicle speed. The method may further comprise using said electronic signal in vehicle tachograph apparatus.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

One or more embodiments of the invention will now be described, by way of example only, with reference to the accompanying drawings, in which.

DESCRIPTION OF AN EMBODIMENT OF THE INVENTION

Figure 1:
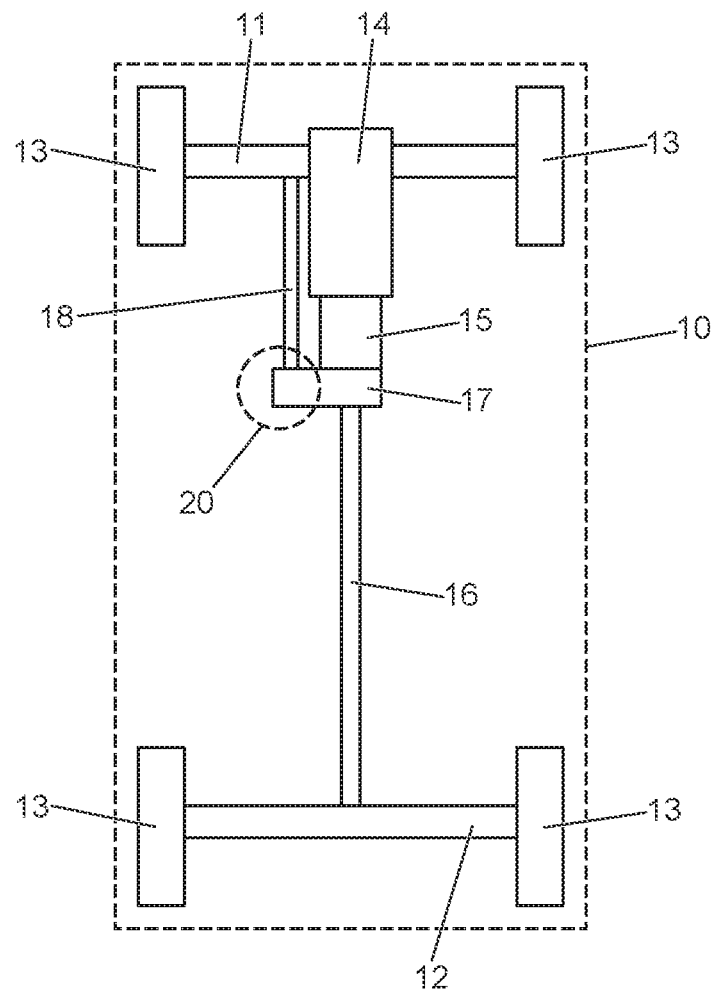
FIG. 1 is a schematic plan view of the drive arrangement of an all-wheel drive vehicle.

With reference to FIG. 1, the drive arrangement of a four wheel drive vehicle is illustrated in FIG. 1. A vehicle 10 comprises a front drive axle 11 and rear drive axle 12, each supporting wheels 13. An internal combustion engine 14 drives a gearbox 15 having multiple speed ratios. The output from the gearbox 15 drives a rear propeller shaft 16 directly, and via a transfer box 17 a front propeller shaft 18. The propeller shafts 16, 18 drive to respective axles 12, 11. The drive configuration of FIG. 1 is entirely conventional.

The transfer box 17 generally comprises a train of three gears or a chain and sprocket drive, with an output flange connectable to the front propeller shaft 18. Drive to the front propeller shaft may be permanent, or disengageable on demand. Drive to the rear propeller shaft is typically permanent.

Figure 2:
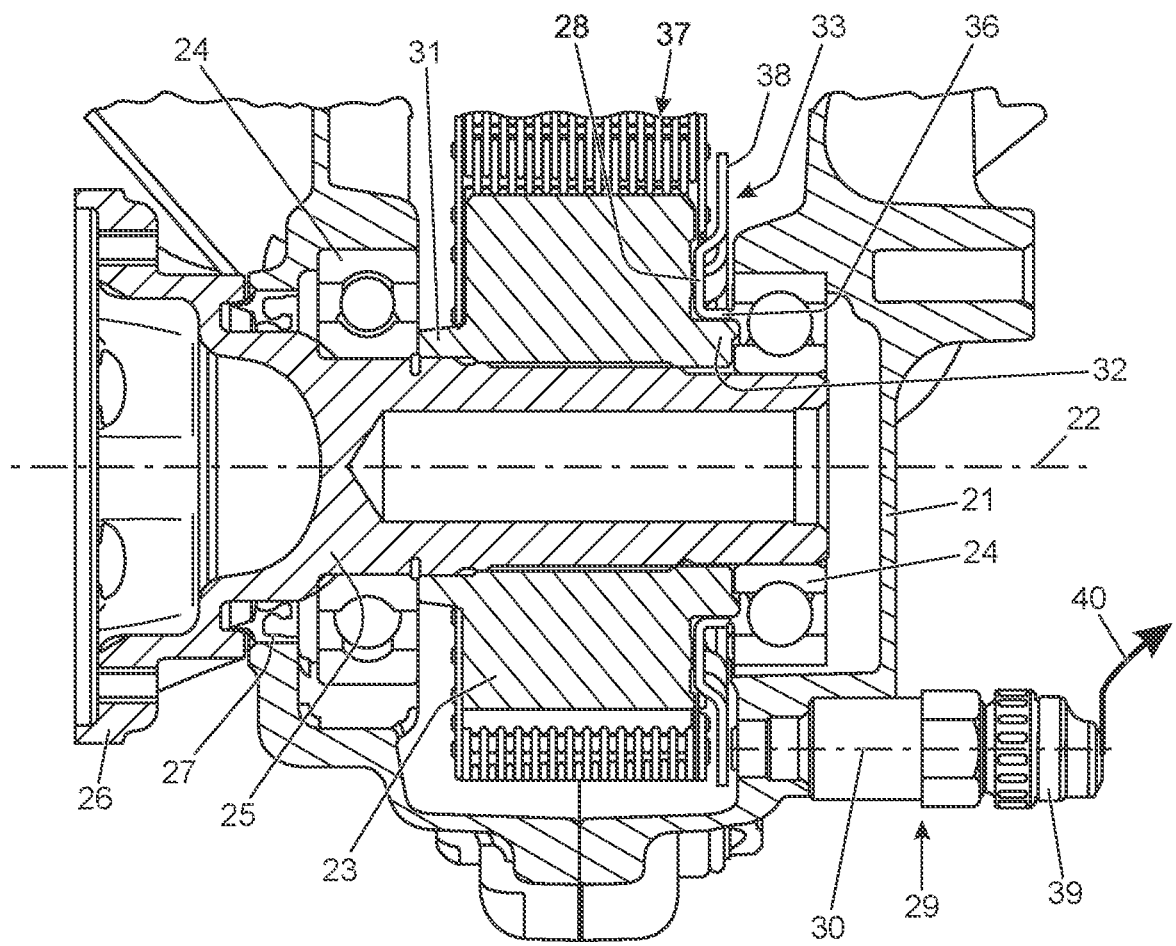
FIG. 2 is an axial cross-sectional view through the output side of an exemplar transfer box casing of FIG. 1.

FIG. 2 illustrates the output region 20 of the transfer box 17. A transfer box casing 21 defines an output axis 22 about which a sprocket 23 is rotatable in ball bearings 24. An output shaft 25 splined to the sprocket 23 passes through the casing and terminates in a flange 26 for connection to the front propeller shaft 18. An oil seal 27 surrounds the shaft 25.

The sprocket 23 is driven by Morse chain 28 from a corresponding sprocket (not shown) on the output axis of the gearbox. This arrangement is conventional, and need not be described in greater detail.

A screw plug 29 is provided through the wall of the casing 21. Conventionally the plug 29 may be a drain plug for draining oil from the casing 21. Alternatively the plug 29 may be a level plug and/or a fill plug for setting the maximum level of oil in the casing 21 upon replenishment thereof.

The sprocket 23 requires side clearance from the casing 21 to permit passage of the chain 28, in particular the outermost links thereof. Accordingly, on either side the sprocket is provided with circumferentially extending shoulders 31, 32 which are in contact with respective inner races of the bearings 24.

A tone wheel 33 is pressed on to the shoulder 32, as illustrated, for rotation therewith. The tone wheel is located within the circumferential space provided by the shoulder 32, and is of a diameter sufficient to cross the rotational axis 30 of the screw plug 29.

Figure 3:
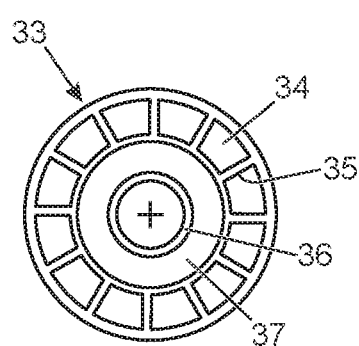
FIG. 3 is an elevation of a tone wheel.

As illustrated in FIG. 3 (on a reduced scale), the tone wheel 33 comprises a plurality of equispaced apertures 34 defining radial arms 35 of substantially equal circumferential width. The tone wheel is typically stamped from sheet steel and includes an orthogonally bent lip 36 at the inside circumference to ensure perpendicularity to the rotational axis 22.

The radially inner portion 37 of the tone wheel engages the side of the sprocket 23, and the radially outer portion 38 is cranked axially away from the sprocket to provide clearance for the chain 28; both inner and outer portions 37, 38 are substantially radially extending.

The screw plug 29 comprises a pick-up 39 for detecting passage of the apertures 34 and radial arms 35 for the purpose of allowing the rotational speed of the tone wheel 33 to be determined. The pick-up 39 may be an inductive pick-up, such as a pick-up relying upon the Hall effect, to generate electrical pulses whose frequency is dependent upon the rotational speed of the tone wheel. The sprocket 23 is in a fixed ratio relationship with the road wheels 13 (according to the drive axle ratio), and accordingly the rotational speed thereof is proportional to road speed. Such pulses may be supplied by electrical lead 40 to a microprocessor, for example a vehicle electronic control unit (ECU), where a road speed signal may be generated.

In one embodiment, the threaded screw plug 29 may be substantially tubular, and the electrical components of the inductive pick-up may be housed therein and retained by a suitable potting material, such as a two-pack epoxy adhesive.

In the illustrated arrangement, the tone wheel 33 is on the output sprocket 23. In this location a speed signal is available in permanent four-wheel drive, or whenever a selectable drive to the front axle is engaged. In an alternative arrangement the tone wheel could be provided on the input sprocket (not illustrated) but since the input sprocket is generally above the output sprocket, this arrangement does not permit the use of a drain plug for the pick-up 39 and may preclude use of a level plug as the pick-up 39.

The number of apertures 34 and arms 35 are selected to give a response capable of being detected by the pick-up 39 within the normal operational speed range of the sprocket 23, and having regard to the radius of the plug axis 30 with respect to the sprocket axis 22.

In the described embodiment, the tone wheel 33 is apertured axially; however it will be understood that an open toothed tone wheel may be required should the rotational axis of the plug be perpendicular to the sprocket axis 22. Such an arrangement would be necessary for a drain plug inserted through the bottom of the casing 21 and having a rotational axis orthogonal to the axis 30.

Furthermore even if drive to the front axle is disconnected at the input of the transfer box, speed will nevertheless be registered by virtue of the sprocket 23 being back-driven from the front wheels. This latter phenomenon may not however occur if the front axle is fitted with disconnectable couplings at the front hubs, which may be provided as an energy saving method of preventing back driving of the front axle gears and shafts.

Modifications and alterations to the invention are envisaged within the scope of the claims appended hereto.

Aspects of the invention will be apparent from the following numbered paragraphs:

1. Speed sensing apparatus for a vehicle transmission, said apparatus comprising a tone wheel of a rotating output element of the transmission, said tone wheel having a plurality of equispaced substantially radial arms, and an inductive pick-up comprising one of a drain plug, a fill plug and a level plug of a transmission casing.
2. The apparatus of aspect 1 wherein said tone wheel is annular and adapted for press-fitting onto said output element on the rotational axis thereof.
3. The apparatus of aspect 2 wherein said output element is an externally toothed drive member.
4. The apparatus of aspect 3 wherein said drive member is a sprocket.
5. The apparatus of aspect 3 wherein said output element comprises an annular shoulder for receiving said tone wheel.
6. The apparatus of aspect 4 wherein said output element comprises an annular shoulder for receiving said tone wheel.

7. The apparatus of aspect 1 wherein said tone wheel has a continuous inner rim extending substantially orthogonally to a radius thereof.

8. The apparatus of aspect 1 wherein said tone wheel comprises a substantially circularly continuous radially inner portion, and a circumferentially toothed radially outer portion.

9. The apparatus of claim 8 wherein said radially outer portion is axially offset from said radially inner portion.

10. The apparatus of aspect 8 wherein said radially outer portion comprises a plurality of circumferentially spaced apertures at a substantially fixed radius.

11. The apparatus of aspect 9 wherein said radially outer portion comprises a plurality of circumferentially spaced apertures at a substantially fixed radius.

12. The apparatus of aspect 1 wherein said inductive pick-up comprises an externally threaded plug body having pick-up sensor within an internal bore thereof.

13. The apparatus of aspect 12 wherein said pick-up sensor includes an electrical connector for attachment of an electrical signal wire.

14. A vehicle transmission including speed sensing apparatus according to aspect 1.

15. A vehicle transmission according to aspect 14 and comprising a transfer gearbox of an all-wheel drive vehicle, said rotating output element being an output sprocket of a Morse chain drive, said output sprocket being fast with an output drive member for attachment to the propeller shaft of a front drive axle.

16. A vehicle transmission of aspect 14 installed in a vehicle.

17. A vehicle transmission of aspect 15 installed in a vehicle.

18. A method of sensing rotational speed of a transmission output element of a vehicle, said element being rotatable in a casing, the method comprising:
   providing a tone wheel on said element for rotation therewith; and
   providing an indicative pick-up for co-operation with said tone wheel, said indicative pick-up being one of a drain plug, a fill plug and a level plug of said casing.

19. The method of aspect 18 comprising:
   converting a digital signal from said indicative pick-up into an electronic signal indicative of vehicle speed.

20. The method of aspect 19 comprising using said electronic signal in vehicle tachograph apparatus.

The invention claimed is:

1. A vehicle transmission comprising:
   a transmission casing having one or more of a drain through-hole, a fill through-hole and a level through-hole;
   a rotating output element of the transmission disposed within the transmission casing; and
   a speed sensing apparatus comprising
   a tone wheel disposed on the rotating output element of the transmission; and
   an inductive pick-up disposed in one of the drain through-hole, the fill through-hole or the level through-hole and comprising one of a drain plug, a fill plug or a level plug.

2. The vehicle transmission of claim 1, wherein said tone wheel is annular and press-fit onto said rotating output element on a rotational axis thereof.

3. The vehicle transmission of claim 1, wherein said tone wheel is received on an annular shoulder of the rotating output element.

4. The vehicle transmission of claim 1, wherein said tone wheel has a continuous inner rim extending substantially orthogonally to a radius of said tone wheel.

5. The vehicle transmission of claim 1, wherein said tone wheel comprises a substantially circularly continuous radially inner portion, and a circumferentially toothed radially outer portion.

6. The vehicle transmission of claim 5, wherein said radially outer portion is axially offset from said radially inner portion.

7. The vehicle transmission of claim 5, wherein said radially outer portion comprises a plurality of circumferentially spaced apertures at a substantially fixed radius.

8. The vehicle transmission of claim 1, wherein said inductive pick-up comprises an externally threaded plug body having a pick-up sensor within an internal bore of said body.

9. The vehicle transmission of claim 8, wherein said pick-up sensor includes an electrical connector for attachment of an electrical signal wire.

10. The vehicle transmission of claim 1, wherein said rotating output element is an externally toothed drive member.

11. The vehicle transmission of claim 10, wherein said drive member is a sprocket.

12. The vehicle transmission according to claim 1, comprising a transfer gearbox of an all wheel drive vehicle, said rotating output element being an output sprocket of a chain drive, said rotating output sprocket being connected with an output drive member for attachment to a propeller shaft of a front drive axle.

13. A vehicle including the vehicle transmission of claim 1.

14. A method of measuring a rotational speed of a rotating output element of a vehicle transmission, the rotating output element being disposed within a transmission casing comprising one or more of a drain through-hole, a fill through-hole and a level through-hole, the method comprising generating an output from an inductive pick-up that cooperates with a tone wheel on the rotating output element, said inductive pick-up being disposed in one of the drain through-hole, the fill through-hole or the level through-hole and comprising one of a drain plug, a fill plug or a level plug.

15. The method of claim 14, wherein generating the output comprises converting a digital signal from said inductive pick-up into an electronic signal indicative of vehicle speed.

16. The method of claim 14, comprising using said output in a vehicle tachograph apparatus.

* * * * *